United States Patent [19]
Dauksher et al.

[11] Patent Number: 6,061,137
[45] Date of Patent: May 9, 2000

[54] IN-SITU ENDPOINT DETECTION FOR MEMBRANE FORMATION

[75] Inventors: William J. Dauksher, Mesa; Pawitterjit S. Mangat, Chandler, both of Ariz.

[73] Assignee: Motorola, Inc., Schaumburg, Ill.

[21] Appl. No.: 09/072,756

[22] Filed: May 4, 1998

[51] Int. Cl.$^7$ .................................................. G01B 11/06
[52] U.S. Cl. .......................................... 356/381; 369/382
[58] Field of Search ................................... 356/381, 369, 356/382

[56] References Cited

U.S. PATENT DOCUMENTS 5,131,752  7/1992  Yu et al. .................................. 356/359

*Primary Examiner*—Frank G. Font
*Assistant Examiner*—Reginald A. Ratliff
*Attorney, Agent, or Firm*—Eugene A. Parsons; A. Kate Huffman

[57] ABSTRACT

A method of in-situ endpoint detection for membrane formation including directing light from a light source onto one side of a membrane structure having at least one etchable component for the formation of a membrane and etching the membrane structure so as to form the membrane while sensing the light from the light source on an opposite side of the membrane structure in-situ during the etching to detect a thickness of the membrane. Generally, the etching step includes fountain cup etching with the light source being a fiber optic mounted in the fountain cup and a detector mounted in the cap.

29 Claims, 3 Drawing Sheets

IN-SITU ENDPOINT DETECTION FOR MEMBRANE FORMATION

FIELD OF THE INVENTION

The present invention includes a process of in-situ endpoint detection for membrane formation and more specifically the formation of membranes for projection electron beam masks, X-ray masks, and the like.

BACKGROUND OF THE INVENTION

Generally, for convenience and because standard semiconductor tools can be used in the fabrication process, radiation masks, e.g. projection electron beam lithography masks, X-ray masks, etc., are formed on a semiconductor wafer, such as a silicon wafer. The silicon wafer operates like a frame and support for the mask. A thin layer that ultimately becomes the membrane is deposited on the upper surface of the wafer. A layer of beam scattering material for projection electron beam lithography or radiation absorbing material for X-rays, such as some safe heavy metal or alloy, is deposited on the upper surface of the membrane layer. For the case of X-ray masks, the radiation absorbing layer is patterned by applying a hard mask material and resist. The resist is patterned (or exposed) with an electron beam (E-beam) device and a hard mask is formed by etching the hard mask layer through the patterned resist layer. The hard mask is then used as an etch mask to pattern the radiation absorbing layer. Patterning of projection electron beam scattering layers is similar, except that the intermediate hardmask layer is usually eliminated because of the reduced thickness of the metal layer. At some point in the process the wafer is etched from the membrane layer in a pattern to form one or more thin membranes. The mask thus allows radiation to pass through the thin membrane and portions of the radiation absorbing or scattering layer that have been etched away. The entire procedure is known as a process flow and two different process flows are commonly used.

In the first process flow, commonly referred to as a wafer flow, all processing is done on the wafer with one of the final steps being the back etching of the silicon wafer to form the membrane. The wafer flow was primarily created to solve formatting issues. It allows refractory radiation mask processing to be conducted in semiconductor tools that are not dramatically different from the standard wafer processing tools supplied by the industry. The refractory radiation mask specific processing steps (membrane formation and wafer mounting to a support ring, if employed) are at the end of the flow. This minimizes the modifications necessary to both the tools and the wafer processes. However, the creation of the membrane and the mounting of the wafer can create significant pattern displacement errors in the mask.

The second process flow is commonly referred to as a membrane flow. In the membrane flow the membrane is formed early in the process (generally after hard mask deposition) and the remaining processing is carried out on the membrane. The membrane flow process was derived to remove the errors in the wafer flow process by conducting the mask specific processing steps before the scattering or absorbing layer is patterned. While this greatly reduces the errors associated with membrane formation and wafer mounting, it also increases the modifications to both the equipment (the tools must accept a refractory radiation mask format rather than a wafer) and the processes (the patterning defining process steps are carried out on a membrane rather than a wafer).

Many properties are considered when selecting a membrane material, but the important ones from the standpoint of silicon etching are the chemical resistance of the membrane material to the liquid etchant (e.g. hot KOH) and overetch times. For thinner membranes (1500 Å and less, as in the case of projection electron beam lithography masks), these issues become far more significant. The use of an electrochemical etch stop layer generally is useful only in the formation of thicker membranes (20–25 $\mu$m) as this method does not have the control or repeatability required for the formation of thinner membranes.

Accordingly, it would be advantageous to have an endpoint system in-situ that could determine when the silicon etch has been completed, thereby minimizing overetch times.

It is a purpose of the present invention to provide new and improved methods of in-situ endpoint detection during membrane formation.

It is another purpose of the present invention to provide new and improved methods of in-situ endpoint detection during the fabrication of radiation masks.

It is still another purpose of the present invention to provide new and improved methods of in-situ endpoint detection during membrane formation, and especially thinner membrane formation, e.g. less than 10,000 Å.

It is a further purpose of the present invention to provide new and improved methods of in-situ endpoint detection during membrane formation which are fully compatible with various silicon etch chemistries as well as any choice of membrane material.

It is a still further purpose of the present invention to provide new and improved methods of in-situ endpoint detection during membrane formation which are extendible to various sensor applications.

SUMMARY OF THE INVENTION

The above problems and others are at least partially solved and the above purposes and others are realized in a method of in-situ endpoint detection for membrane formation including directing light from a light source onto one side of a membrane structure having at least one etchable component for the formation of a membrane and etching the membrane structure so as to form the membrane while sensing the light from the light source on an opposite side of the membrane structure in-situ during the etching to detect a thickness of the membrane.

In a preferred embodiment, the etching step includes 'fountain cup' etching with the light source being a fiber optic mounted in the fountain cup and a detector mounted in the cap. Also in a preferred embodiment, during the light sensing, the spectrum of the light is analyzed to detect either the thickness of the membrane or the desired end point for the etching. The membranes are generally used in a process of forming either an X-ray mask or a projection electron beam mask on the membrane.

BRIEF DESCRIPTION OF THE DRAWINGS

Referring to the drawings.

DESCRIPTION OF THE PREFERRED EMBODIMENTS

For simplicity in understanding the operation and some various applications of the novel in-situ endpoint detection system disclosed herein, a brief description of a wafer flow process and a membrane flow process used in the fabrication of radiation masks, e.g. projection electron beam lithography masks, X-ray masks, etc. are described below. In each of the specific examples set forth below, a projection electron beam lithography mask is fabricated, it will be understood, however, that X-ray masks and any other types of radiation masks can be fabricated with only slight variations in the process.

Figure 1:
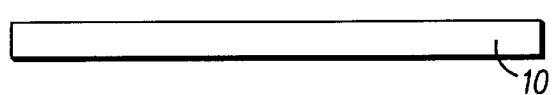
FIGS. 1 through 5 are simplified sectional views illustrating several initial steps in two different membrane fabrication processes.
Figure 2:
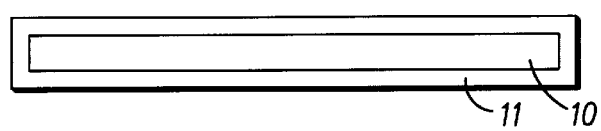
Figure 3:
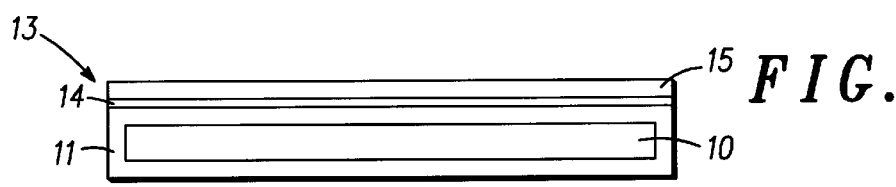
Figure 4:
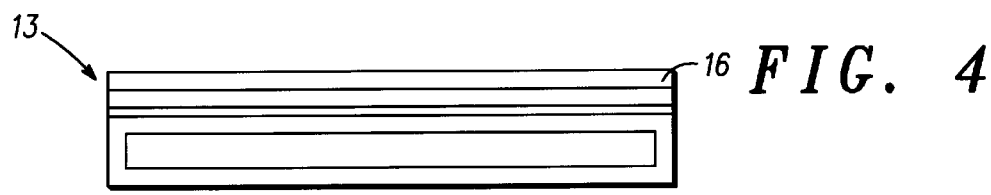
Figure 5:
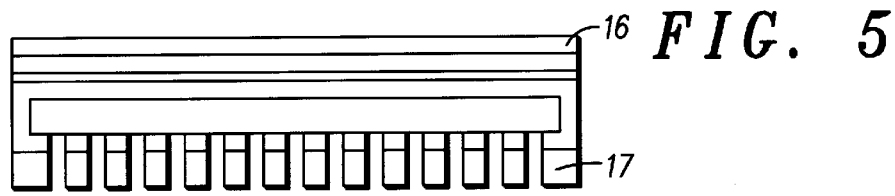

Referring to FIGS. 1 through 5, several initial steps which are used in both membrane fabrication processes are illustrated. Specifically, FIG. 1 illustrates a sectional view of a silicon wafer 10 which is covered with a membrane layer 11 (e.g. SiN or the like) deposited, by an LPCVD process or the like, as illustrated in FIG. 2. Etch stop and scatterer films 13 are deposited on the upper surface of membrane layer 11, as illustrated in FIG. 3, by any convenient process. In this specific example, films 13 include a thin etch stop layer or film of chromium 14 with a thicker scatterer layer or film of tantalum silicide (TaSi) 15. As illustrated in FIG. 4, a protective layer 16, of some material such as chromium or the like, is deposited over scatterer film 15. A resist layer 17 is applied to the backside of membrane layer 11, as illustrated in FIG. 5, and patterned to form a mask defining a plurality of membranes, as will be explained in more detail presently. Using the mask, the backside of membrane layer 11 is etched to expose windows in the rear surface of wafer 10. At this point the wafer flow and membrane flow processes diverge.

Figure 6:
FIGS. 6 through 10 are simplified sectional views illustrating additional steps in a wafer flow process for membrane fabrication.
Figure 7:
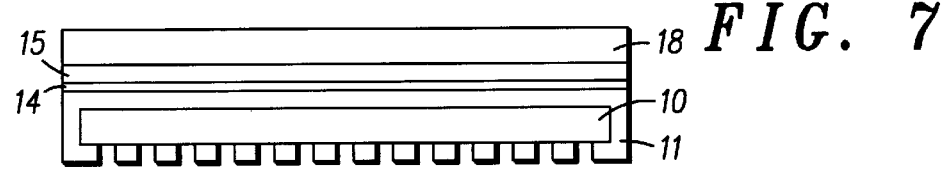
Figure 8:
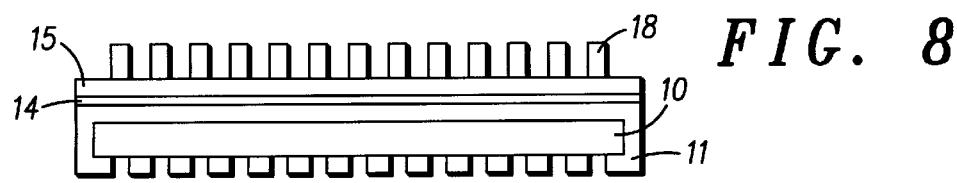
Figure 9:
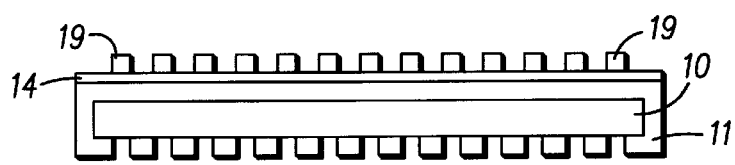
Figure 10:
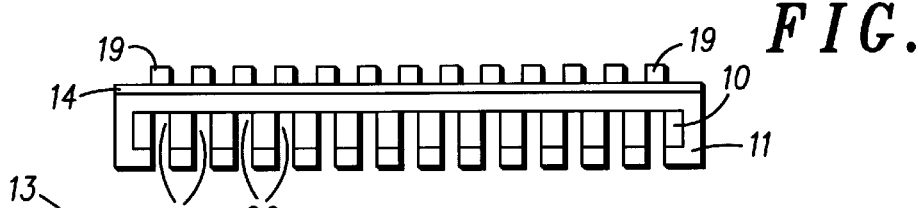

Continuing with the wafer flow process and referring to FIG. 6, the remaining resist layer 17 is stripped from the backside of membrane layer 11 and protective layer 16 is removed from the surface of scatterer film 15. The pattern formed in the backside of membrane layer 11 defines or positions a plurality of membranes, to be explained presently. As illustrated in FIG. 7, a resist layer 18 is deposited over scatterer film 15 and patterned, as illustrated in FIG. 8, to form an etch mask for scatterer film 15. Scatterer film 15 is etched by some convenient technique, such as RIE, with the thin layer 14 serving as an etch stop and protection layer for membrane layer 11. After the etching of scatterer film 15 to form scattering members 19 is complete, the remainder of resist layer 18 is removed so that a scatterer pattern remains on the upper surface of membrane layer 11, as illustrated in FIG. 9. Depending upon thickness and selection of material, etch stop layer 14 may be removed to increase electron transmission in areas where scattering member 19 is not present. Wafer 10 is then etched through the openings in the lower surface of membrane layer 11 so as to form a membrane 20 beneath each scattering member 19, as illustrated in FIG. 10.

The etching of wafer 10 to form membranes 20, in a preferred embodiment, is performed using a fountain cup etching technique with an etchant, such as KOH. A fountain cup etching apparatus and method are disclosed in a copending United States of America patent application entitled "Etching Apparatus and Method of Etching a Substrate", Ser. No. 08/929,686, filed Sep. 15, 1997 and assigned to the same assignee. The etching apparatus and method of etching disclosed in the above described application are included herein by reference.

Figure 11:
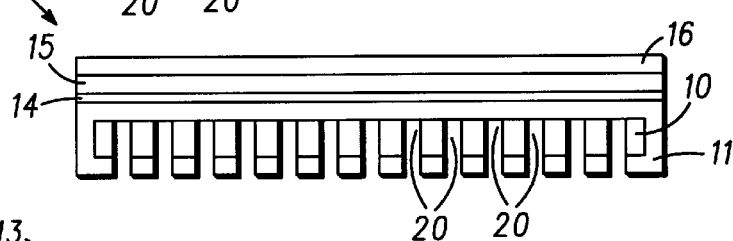
FIGS. 11 through 15 are simplified sectional views illustrating additional steps in a membrane flow process for membrane fabrication.
Figure 12:
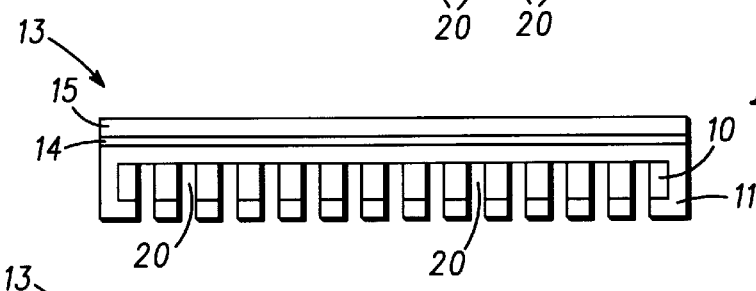
Figure 13:
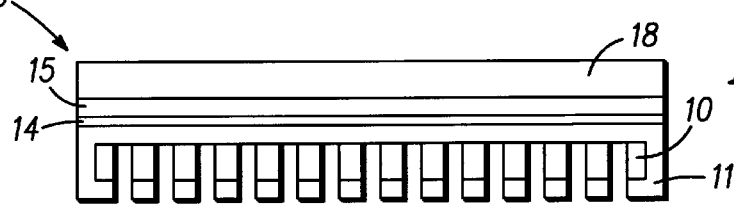
Figure 14:
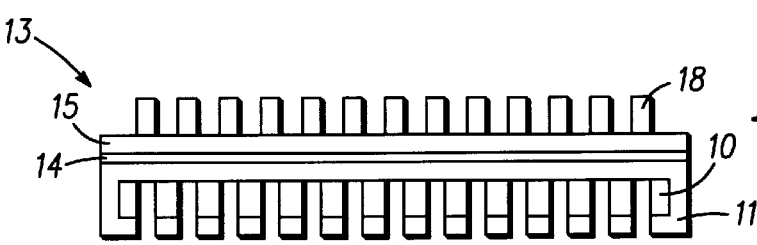
Figure 15:
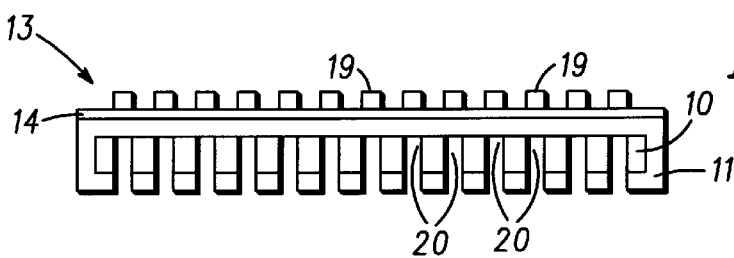

Continuing with the membrane flow process and referring to FIG. 11, the remaining resist layer 17 (see FIG. 5) is stripped from the backside of membrane layer 11. Wafer 10 is then etched through the openings in the lower surface of membrane layer 11 so as to form a plurality of spaced apart membranes 20, as illustrated in FIG. 12. The etching of wafer 10 to form membranes 20, in a preferred embodiment, is performed using a fountain cup etching technique with an etchant, such as KOH. After the etching of wafer 10 is completed, protective layer 16 is stripped and a resist layer 18 is deposited over scatterer film 15 (see FIG. 13) and patterned, as illustrated in FIG. 14, to form an etch mask for scatterer film 15. Scatterer film 15 is etched by some convenient technique, such as RIE, with the thin layer 14 serving as an etch stop and protection layer for membrane layer 11. After the etching of scatterer film 15 to form a scattering member 19 positioned on each membrane 20 as illustrated in FIG. 15, the remainder of resist layer 18 is removed so that a scatterer pattern remains on the upper surface of membrane layer 11.

Figure 16:
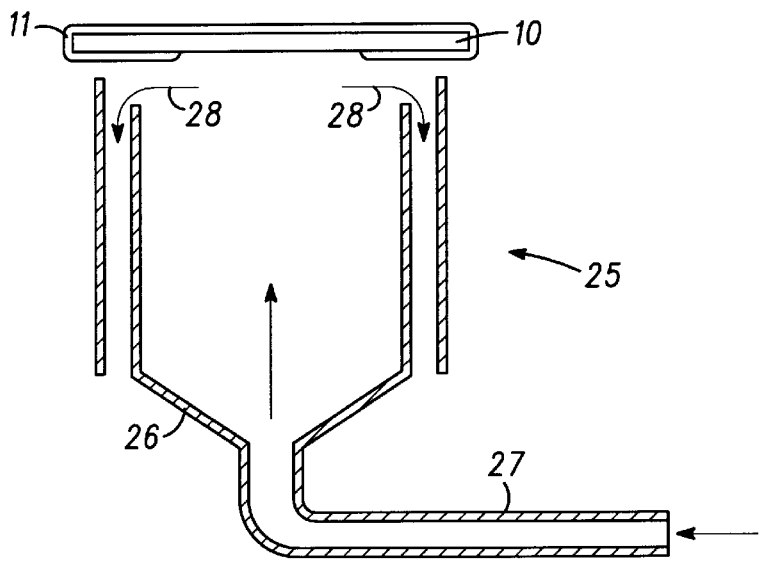
FIG. 16 is a simplified cross-sectional view of fountain cup etching apparatus.

In each of the wafer flow and membrane flow processes described above, the wafer etching technique is of concern because of the time and difficulty in forming the membranes 20. Generally, whichever process is used, the wafer or other supporting structure with the various layers positioned thereon is referred to as a "membrane structure" herein for convenience of description. As explained briefly above, membranes 20 are formed in a preferred embodiment by etching the membrane structure (e.g. wafer 10 and accompanying layers) using fountain cup etching apparatus, illustrated in a simplified or schematic form in FIG. 16. In this etching technique, wafer 10, as illustrated either in FIG. 10 or 11, is placed in the fountain cup etching apparatus, generally designated 25. Apparatus 25 includes a cup shaped container 26 which is continuously over-filled with an etching solution from a reservoir (not shown) by means of a conduit 27. The etching solution continuously over-flows cup shaped container 26 and is returned to the reservoir, as illustrated by arrows 28. A membrane structure, represented herein as wafer 10 with membrane layer 11 thereon, is positioned over cup shaped container 26 so that the lower surface is in the flow of the etching solution and is gently etched by the etching solution.

Figure 17:
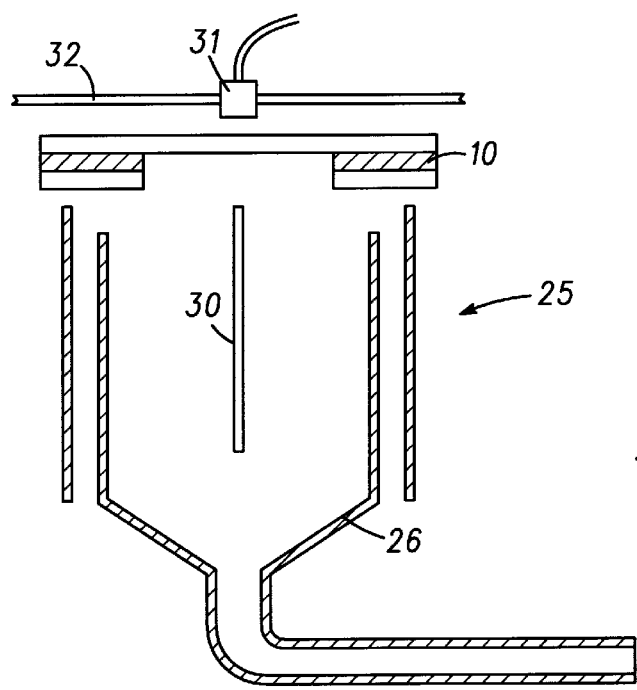
FIG. 17 is a simplified cross-sectional view of fountain cup etching apparatus incorporating in-situ endpoint detection in accordance with the present invention.

Turning now to FIG. 17, a simplified cross-sectional view of fountain cup etching apparatus 25 having wafer 10 with membrane layer 11 mounted therein is illustrated. Also, fountain cup etching apparatus 25 includes an embodiment of in-situ endpoint detection in accordance with the present invention. As explained above, wafer 10 with membrane layer 11 thereon is positioned over cup shaped container 26 so that the lower surface is in the flow of the etching solution. Light from a light source is directed onto the lower surface of the membrane structure, in this specific embodiment through an optical fiber 30. One or more optical fibers 30 can be conveniently mounted within the cup of fountain cup etching apparatus 25 without being damaged by the etching solution or adversely effecting the flow of the etching solution.

A light sensing device 31 is mounted in fountain cup etching apparatus 25, for example in an opening through a cap or cover 32 of the device, so as to receive light from optical fiber 30 as it transits the membrane structure. A variety of different techniques can be utilized to determine the thickness of the membrane or membranes from the sensed light. Several examples of such techniques are set forth below. Depending upon the specific membrane structure and membrane or membranes being fabricated, the etching can be stopped at a specific sensed point or a predetermined amount of overetching can be performed, after which the etching is stopped.

In a relatively simple form of sensing, the intensity of the sensed light can be measured directly and compared to a standard light which has been empirically adjusted for the correct membrane thickness. This method may not be as accurate as some other methods because the light intensity will change very little for small thicknesses (e.g. nanometers) of membrane structure.

Figure 18:
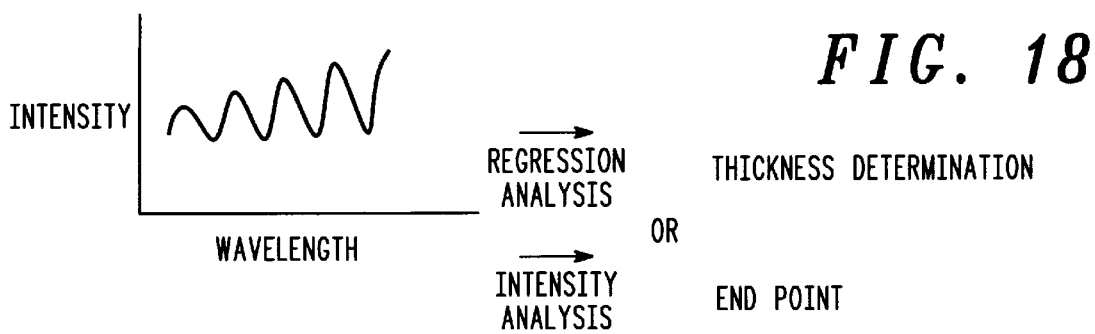
FIG. 18 is a graphical representation of a characteristic interference spectrum utilized in a thickness or endpoint determination process.

In a more accurate method, the light directed onto the lower surface of the membrane structure begins to create a characteristic interference pattern at light sensing device 31 as the thickness of wafer 10 of the membrane structure approaches approximately 20 $\mu$m. For example, in the embodiment illustrated, the light from optical fiber 30 illuminates an area of approximately 2 mm diameter. An interference pattern is created by reflections of this light between the upper and lower surfaces of membrane 20 including wafer 10. A typical graphical representation of a characteristic interference spectrum utilized in a thickness determination process is illustrated in FIG. 18. Generally, in a characteristic interference spectrum the number of peaks is greater for thicker membranes and decreases as the thickness decreases. Also, the number of peaks in a characteristic interference spectrum is material specific. Further, as indicated by the vertical axis of the graphical representation of FIG. 18, as the intensity increases the peaks increase in height. Thus, the number (wavelengths) and or height of the peaks can be detected to determine either the thickness of the membrane or an endpoint for the etching process.

Typically, a characteristic interference spectrum can be developed for a specific material being utilized and for a desired membrane thickness. This can be accomplished, for example, by empirical physical formula or by empirically providing a membrane with a desired thickness and utilizing the characteristic interference spectrum from that membrane structure as a standard. Then, either through a process of fitting the peaks developed from a membrane structure being etched to the formulas with regression analysis or by comparing to the 'standard', a thickness or endpoint of the etching process can be determined.

When a membrane structure having a plurality of membranes, such as that illustrated in FIGS. 10 or 11, is being etched, it may be possible to only sense the thickness of one or several of the membranes. Also, in some processes some of the plurality of membranes may etch faster than others. Thus, it may be necessary to provide some amount of overetching after the peaks of the characteristic interference spectrum have been fit or matched in order to etch all of the membranes to within a desired tolerance. To this end, some amount of trial and error in the matching and overetching may be required to arrive at a desired overall etch. However, it should be noted that because of the very accurate measurement capabilities of the disclosed in-situ endpoint detection, any overetching required is decreased to a minimum. Also, the thickness of the membrane can be accurately determined in-situ for characterization purposes of both the etch process itself as well as for ascertaining membrane transmission.

For the sake of simplicity, the in-situ end point detection technique has been described above considering just a membrane layer being present. Artisans will recognize that the same technique can be easily adapted to membranes bearing thin metals (as is the case for projection electron beam lithography masks) or other materials.

Thus, new and improved methods of in-situ endpoint detection during membrane formation have been disclosed. This in-situ endpoint detection is especially useful during thinner membrane formation, e.g. membranes with a thickness less than 10,000 Å. Further, the new and improved methods of in-situ endpoint detection during membrane formation are fully compatible with various etch chemistries as well as any choice of membrane material and are extendible to various sensor types and applications.

While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

For example, silicon etching can also be accomplished via immersion or immersion in concert with a one-side-protective fixture. Those skilled in the art will realize that minor modifications can be made to the in-situ endpoint system herein disclosed to adapt it to other silicon etch techniques.

What is claimed is:

1. A method of in-situ endpoint detection for membrane formation comprising the steps of:

providing a membrane structure including at least one etchable component for the formation of a membrane;

directing light from a light source onto one side of the membrane structure; and etching the membrane structure and sensing the light that transits the membrane structure from the light source on an opposite side of the membrane structure in-situ during the etching to detect a thickness of the membrane or to determine etch endpoint and to form the membrane.

2. A method of in-situ endpoint detection for membrane formation as claimed in claim 1 wherein the step of providing the membrane structure includes providing a membrane structure with a silicon wafer support and a layer of material affixed thereon.

3. A method of in-situ endpoint detection for membrane formation as claimed in claim 1 wherein the etching step includes a process of fountain cup etching.

4. A method of in-situ endpoint detection for membrane formation as claimed in claim 3 wherein the step of directing light from the light source onto one side of the membrane structure includes using a fiber optic mounted in the fountain cup.

5. A method of in-situ endpoint detection for membrane formation as claimed in claim 1 wherein the step of sensing the light from the light source includes using one of a diode detector, CCD array, and a spectrometer.

6. A method of in-situ endpoint detection for membrane formation as claimed in claim 1 wherein the step of sensing the light from the light source includes performing a regression analysis for a thickness determination.

7. A method of in-situ endpoint detection for membrane formation as claimed in claim 6 wherein the light from the light source has a spectrum and the step of performing a regression analysis for a thickness determination includes performing a regression analysis on the spectrum of the light.

8. A method of in-situ endpoint detection for membrane formation as claimed in claim 1 wherein the step of sensing the light from the light source includes performing an intensity analysis for an endpoint determination.

9. A method of in-situ endpoint detection for membrane formation as claimed in claim 8 wherein the light from the light source has a spectrum and the step of performing an intensity analysis for an endpoint determination includes performing an analysis on the intensity of the light spectrum.

10. A method of in-situ endpoint detection for membrane formation as claimed in claim 1 wherein the step of etching the membrane structure so as to form the membrane includes etching the membrane structure to form a membrane with a thickness in a range of less than ten thousand angstroms.

11. A method of in-situ endpoint detection for membrane formation as claimed in claim 1 including an additional step, subsequent to the etching step, of forming an X-ray mask on the membrane.

12. A method of in-situ endpoint detection for membrane formation as claimed in claim 1 including an additional step, prior to the steps of directing light and etching, of forming an X-ray mask on the membrane structure.

13. A method of in-situ endpoint detection for membrane formation as claimed in claim 1 wherein the step of etching the membrane structure so as to form the membrane includes etching the membrane structure to form a membrane in a range of less than approximately 1500 Å.

14. A method of in-situ endpoint detection for membrane formation as claimed in claim 1 including an additional step, subsequent to the etching step, of forming a projection electron beam mask on the membrane.

15. A method of in-situ endpoint detection for membrane formation as claimed in claim 1 including an additional step, prior to the steps of directing light and etching, of forming a projection electron beam mask on the membrane structure.

16. A method of in-situ endpoint detection for membrane formation comprising the steps of:

providing a membrane structure including a silicon wafer support and a layer of material affixed thereon for the formation of a membrane;

directing light from a light source onto one side of the membrane structure; and etching the membrane structure using a process of fountain cup etching, sensing the light that transits the membrane structure from the light source on an opposite side of the membrane structure in-situ during the etching, and analyzing the light from the sensing step to detect one of a thickness of the membrane or an end point for the etching and to form the membrane.

17. A method of in-situ endpoint detection for membrane formation as claimed in claim 16 wherein the step of directing light from the light source onto one side of the membrane structure includes using a fiber optic mounted in the fountain cup.

18. A method of in-situ endpoint detection for membrane formation as claimed in claim 16 wherein the step of sensing the light from the light source includes using one of a diode detector, CCD array, and a spectrometer.

19. A method of in-situ endpoint detection for membrane formation as claimed in claim 16 wherein the step of sensing the light from the light source includes performing a regression analysis for a thickness determination.

20. A method of in-situ endpoint detection for membrane formation as claimed in claim 19 wherein the light from the light source has a spectrum and the step of performing a regression analysis for a thickness determination includes performing a regression analysis on the spectrum of the light.

21. A method of in-situ endpoint detection for membrane formation as claimed in claim 16 wherein the step of sensing the light from the light source includes performing an intensity analysis for an endpoint determination.

22. A method of in-situ endpoint detection for membrane formation as claimed in claim 21 wherein the light from the light source has a spectrum and the step of performing an intensity analysis for an endpoint determination includes performing an analysis on the intensity of the light spectrum.

23. A method of in-situ endpoint detection for membrane formation as claimed in claim 16 wherein the step of etching the membrane structure so as to form the membrane includes etching the membrane structure to form a membrane with a thickness in a range of less than ten thousand angstroms.

24. A method of in-situ endpoint detection for membrane formation as claimed in claim 16 including an additional step, subsequent to the etching step, of forming an X-ray mask on the membrane.

25. A method of in-situ endpoint detection for membrane formation as claimed in claim 16 including an additional step, prior to the step of directing light and etching, of forming an X-ray mask on the membrane structure.

26. A method of in-situ endpoint detection for membrane formation as claimed in claim 16 wherein the step of etching the membrane structure so as to form the membrane includes etching the membrane structure to form a membrane in a range of less than approximately fifteen hundred angstroms.

27. A method of in-situ endpoint detection for membrane formation as claimed in claim 16 including an additional step, subsequent to the etching step, of forming a projection electron beam mask on the membrane.

28. A method of in-situ endpoint detection for membrane formation as claimed in claim 16 including an additional step, prior to the steps of directing light and etching, of forming a projection electron beam mask on the membrane structure.

29. A method of in-situ endpoint detection for membrane formation comprising the steps of:

providing a membrane structure including a silicon wafer support and a layer of material affixed thereon for the formation of a membrane;

directing light from a light source onto one side of the membrane structure;

etching the membrane structure using a process of fountain cup etching, sensing the light that transits the membrane structure from the light source on an opposite side of the membrane structure in-situ during the etching, and analyzing the light from the sensing step to detect one of a thickness of the membrane or an end point for the etching to form the membrane with a thickness less than ten thousand angstroms; and forming one of an X-ray mask and a projection electron beam mask on the membrane.

* * * * *